3,261,742
SOIL DISINFECTANT COMPOSITIONS COMPRISING 2,3-DIBROMOPROPIONITRILE AND 1,2,2-TRICHLORO-1-NITROETHYLENE
Zitsuichi Kishikawa, Osaka, and Tatsuo Harada, Kawachinagano-shi, Osaka, Japan, assignors to Nihon Nohyaku Kabushiki Kaisha, Tokyo, Japan
No Drawing. Filed Nov. 27, 1963, Ser. No. 326,376
Claims priority, application Japan, July 9, 1963, 38/35,207
1 Claim. (Cl. 167—22)

This invention relates to novel soil disinfectant compositions. More particularly it relates to novel soil disinfectant compositions containing mixtures of one part by weight of 2.3-dibromopropionitrile ($CH_2Br \cdot CHBrCN$) and from 0.1 to 10 parts by weight of 1.2.2-trichloro-1 nitroethylene ($CCl_2=CClNO_2$) as active ingredients.

The object of this invention is to provide soil disinfectants which work on soil infested by nematodes and bacteria as contact poisons or fumigant poisons, thereby affording remarkable disinfective effects. The nematodes refer to such as root knot nematodes, cist nematodes which are harmful to plants and the bacteria are those such as Fusarium, Pythium, Pseudomonas, Pellicularia and Hypochnus groups which are also harmful to plants. Conventional disinfectants such as D-D, dibromoethane, chloropicrin, etc., which have been proposed to exterminate harmful microorganisms growing in soil, are mostly liquid which generates by fumigation vapor capable of destroying harmful microorgnaisms, but these compounds have such a drawback that their developing toxicity needs a long time, in other words, until soil is made toxic. Another drawback is that they make immediate planting after the treatment impossible because they possess strong toxicity against plants. Furthermore disinfecting action of these fumigants are mostly selective, accordingly it has been impossible to exterminate simultaneously by a single chemical agent soil nematodes and soil bacteria which are the major harmful microorganisms in soil.

These fumigants have not only these drawbacks but also still others, namely, they are dangerous to handle and poisonous to humans and animals and far from being satisfactory soil disinfectant agents.

Among other conventional drugs, such compounds as Terraxlor, Mylone, organic mercury compounds which are solid at a room temperature, are not satisfactory in that diffusion and permeability of their toxicity into soil is insufficient, accordingly their actions are restricted and their prices relatively expensive.

The object of this invention is to provide novel disinfectant compositions having no such drawbacks as mentioned above and which are particularly satisfactory fungicides for soil.

Toxicity of halogenated hydrocarbon derivations against soil nematodes have been investigated, particular attention given to the disinfecting effects against harmful microorganisms in soil. It was found that 2.3-dibromopropionitrile has not only a strong nematoicdal effect but also shows powerful toxicity against harmful bacteria in soil, particularly powerful disinfecting effects which selectively act against harmful soil bacteria belonging to the Pythium group. Further we discovered that 1.2.2-trichloro-1-nitroethylene shows moderate toxicity against harmful soil nematodes and conspicuous toxicity against harmful soil bacteria, particularly powerful sterilizing effects which selectively act against the Fusarium group bacteria.

Based on these facts and with further research we discovered that mixed chemicals containing one part of 2.3-dibromopropionitrile ($CH_2Br \cdot CHBrCN$) and from 0.1 to 10 parts of 1.2.2-trichloro-1-nitroethylene.

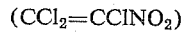

are very effective against wide variety of harmful soil microorganisms and this is attributed to a synergistic effect of two components. According to these drugs, it is possible to entirely prevent crop damage caused by three principal soil bacteria, i.e., bacteria of Pythium group, of Fusarium group, and of Pellicularia group by employing these drugs in a dosage smaller than when the individual component is singly used, thereby simultaneously preventing crop damage due to harmful soil nematodes as well.

The most important advantages of the present compositions are: firstly when compared with conventional soil disinfectants and seed-treatment agents such as organic mercury compounds, Captan, TMTD, PCNB which are actually used, the sterilizing effects of these compositions are extremely superior; secondly when compared with chloropicrin which has been considered the most effective agent among conventional soil disinfectants, the period from treatment by drug to planting can be extremely shortened, the present compositions are effective even in cold season without giving phytotoxicity, and such laborious work as covering by sheets or water which is necessary to prevent evaporation in gas form is eliminated, accordingly the handling is made for simpler.

The foregoing advantages cannot be seen in individual chemicals, i.e., 2-3-dibromopropionitrile or 1.2.2-trichloro-1-nitroethylene. They can only be seen in the compositions having aforementioned mixing ratio. The reason of the present invention being proposed as novel soil disinfectants lies in this fact.

The one component of the present composition, 2.3-dibromopropionitrile, can be made easily and quantitatively by adding bromine to acrylonitrile, and the other component, 1.2.2-trichloro-1-nitroethylene, can be obtained by treating trichloronitroethane (which is prepared by passing $NO_2Cl$ in trichloroethylene) with water or methanol.

When the present compositions are to be used as soil disinfectants, they can be used with or without mixing with carriers. The carrier in this instance is either solid or liquid vehicle carrying the poison to the objects, i.e., to the soil microorganisms. For example, it can be made into dispersion by means of a soap or other dispersant or emulsifier and can be applied to soil by mixing with irrigation water. If desired, it is possible to mix the present composition with a solid carrier to be sprayed with a suitable sprayer, or applied into the soil by spading or other similar methods. It is also possible to dissolve the present toxic agent in such an organic liquid compound as xylene, methylnaphthalene, dimethyl formamide and petroleum distillate to be poured into the soil. It is also possible to mix with common agricultural adjuvants such as spreading agents, dispersing agents or wetting agents for the purpose of improvement of the efficiency and security of the effect. The present exterminating agent can be employed by admixing with insecticides or nematocides such as Aldrin, Heptachlor, BHC, D-D, EDB, DBCP, etc., by admixing with such a fungicide as sulphur compounds, copper compounds, mercuric compounds and nitrogen compounds by admixing with soil disinfectant such as chloropicrin, methyl bromide or by admixing with a plant-growth regulator like 2.4-D or with a fertilizer.

The invention is illustrated by the following examples in which (unless otherwise stated) the proportions referred to are parts by weight.

EXAMPLE 1

20 parts of 2.3-dibromopropionitrile, 20 parts of 1.2.2-trichloro-1-nitroethylene, 15 parts of xylene, 10 parts of methylnaphthalene, 20 parts of pentachloroethane, 10 parts of polyoxyethylene (10 moles) nonylphenyl ether and 5 parts of calcium dodecylbenzene sulfonate are mixed and dissolved, thereby to produce an emulsifiable concentrate.

EXAMPLE 2

2 parts of 2.3-dibromopropionitrile, 4 parts of 1.2.2-trichloro-1-nitroethylene, 10 parts of diatomaceous earth and 84 parts of clay are mixed and ground to produce a dust.

EXAMPLE 3

4 parts of 2.3-dibromopropionitrile, and 2 parts of 1.2.2-trichloro-1-nitroethylene are absorbed in granules prepared by special diluents.

EXAMPLE 4

4 parts of 2.3-dibromopropionitrile, 4 parts of 1.2.2-trichloro-1-nitroethylene, 40 parts of carbon disulphide and 52 parts of solvent kerosene are mixed and dissolved to produce an oil.

In order to prove the effectiveness of the present compositions, they are experimented against harmful bacteria and nematodes in soil as follows:

*Experiment 1.—Disinfecting effect against soil microorganisms (pathogens)*

*Experimental method.*—Harmful bacteria in soil which have been cultured in wheat bran (*Pythium aphanidermatum, Pellicularia filamentosa* or *Fusarium oxysporum* f. *lycopersici*) are mixed with upper layer of soil in a pot to inoculate it, cucumber seeds are sowed and samples of drug having an indicated concentration is poured thereon at a rate of 7 l./3.3 m.². Investigation is conducted after two weeks.

*Experimental results:*

(a) Effects against *Pythium aphanidermatum*.

| Compounds | Concentration (p.p.m.) | Germination ratio (percentage) | Normal growth ratio (percentage) |
|---|---|---|---|
| 2.3-dibromopropionitrile | 1,000 | 96.7 | 80.0 |
|  | 500 | 90.0 | 60.0 |
|  | 300 | 78.3 | 41.7 |
| 1.2.2-trichloro-1-nitroethylene | 1,000 | 50.0 | 25.0 |
|  | 500 | 43.3 | 8.3 |
|  | 250 | 28.3 | 6.7 |
| 2.3-dibromopropionitrile plus 1.2.2-trichloro-1-nitroethylene | 500+500 | 95.0 | 80.0 |
|  | 500+250 | 95.0 | 85.0 |
|  | 300+500 | 96.8 | 83.6 |
|  | 300+250 | 93.3 | 70.0 |
| Captan | 2,000 | 48.3 | 6.7 |
|  | 1,000 | 55.0 | 6.7 |
| Organomercuric compound | [1] 20 | 43.3 | 15.0 |
| Inoculated but without treatment |  | 0 | 0 |
| Neither inoculated nor treated |  | 96.7 | 63.3 |

[1] As Hg.

(b) Effects against *Pellicularia filamentosa*.

| Compounds | Concentration (p.p.m.) | Germination ratio (percentage) | Normal growth ratio (percentage) |
|---|---|---|---|
| 2.3-dibromopropionitrile | 1,000 | 82.3 | 40.0 |
|  | 500 | 96.7 | 50.0 |
|  | 300 | 51.7 | 13.3 |
| 1.2.2-trichloro-1-nitroethylene | 1,000 | 91.7 | 38.3 |
|  | 500 | 93.3 | 35.0 |
|  | 250 | 50.0 | 5.0 |
| 2.3-dibromopropionitrile plus 1.2.2-trichloro-1-nitroethylene | 500+500 | 98.3 | 60.0 |
|  | 500+250 | 90.0 | 76.7 |
|  | 300+500 | 95.0 | 76.7 |
|  | 300+250 | 95.0 | 63.3 |
| Captan | 2,000 | 91.7 | 8.3 |
|  | 1,000 | 88.3 | 11.7 |
| Organomercuric compound | [1] 20 | 81.7 | 11.7 |
| Inoculated but without treatment |  | 38.3 | 0 |
| Neither inoculated nor treated |  | 96.7 | 96.7 |

[1] As Hg.

(c) Effects against *Fusarium oxysporum* f. *lycopersici*.

| Compounds | Concentration (p.p.m.) | Germination ratio (percentage) | Normal growth ratio (percentage) |
|---|---|---|---|
| 2.3-dibromopropionitrile | 1,000 | 82.3 | 40.0 |
|  | 500 | 96.7 | 50.0 |
|  | 300 | 95.0 | 28.3 |
| 1.2.2-trichloro-1-nitroethylene | 1,000 | 95.0 | 66.7 |
|  | 500 | 95.0 | 55.0 |
|  | 250 | 98.3 | 45.0 |
| 2.3-dibromopropionitrile plus 1.2.2-trichloro-1-nitroethylene | 500+500 | 96.7 | 78.3 |
|  | 500+250 | 95.0 | 71.7 |
|  | 300+500 | 100.0 | 71.7 |
|  | 300+250 | 96.7 | 60.0 |
| Captan | 2,000 | 91.7 | 41.7 |
|  | 1,000 | 95.0 | 51.7 |
| Organomercuric compound | [1] 20 | 95.0 | 60.7 |
| Inoculated but without treatment |  | 83.3 | 5.0 |
| Neither inoculated nor treated |  | 96.7 | 63.3 |

[1] As Hg.

(d) Effects against mixed infection of three kinds of bacteria: *Pythium aphanidermatum+Pellicularia filamentosa+Fusarium oxysporum* f. *lycopersici*.

| Compounds | Concentration (p.p.m.) | Germination ratio (percentage) | Normal growth ratio (percentage) |
|---|---|---|---|
| 2.3-dibromopropionitrile | 1,000 | 86.7 | 40.0 |
|  | 500 | 80.0 | 41.7 |
|  | 300 | 78.3 | 11.7 |
| 1.2.2-trichloro-1-nitroethylene | 1,000 | 28.3 | 3.3 |
|  | 500 | 15.0 | 1.7 |
|  | 250 | 3.3 | 0 |
| 2.3-dibromopropionitrile plus 1.2.2-trichloro-1-nitroethylene | 500+500 | 91.7 | 85.0 |
|  | 500+250 | 95.0 | 88.3 |
|  | 300+500 | 85.0 | 71.7 |
|  | 300+250 | 85.0 | 78.3 |
| Captan | 2,000 | 48.3 | 6.7 |
|  | 1,000 | 55.0 | 6.7 |
| Organomercuric compound | [1] 20 | 33.3 | 1.7 |
| Inoculated but without treatment |  | 15.0 | 0 |
| Neither inoculated nor treated |  | 55.0 | 26.7 |

[1] As Hg.

*Experiment 2.—Effects against nematodes in soil*

The soil infested by root knot nematodes (*Meloidogyne incognita* var. *acrita*) is placed in a pot and on the surface of this soil, a liquid containing 500 p.p.m. 2.3-dibromopropionitrile and 500 p.p.m. 1.2.2-trichloro-1-nitroethylene is poured thereon at a rate of 7 l. per 3.3 m.². Leaving the pot in a greenhouse for 14 days, pouring water ocasionally as in the case of plant cultivation, the soil in the pot is stirred sufficiently and number of living nematodes in soil is measured under microscope after extracting by Weilmann's method. As illustrated in the following table nematodes density is clearly reduced when compared with non-treated case.

| Compounds | Concentration (p.p.m.) | Number of living nematodes in 30 g. of soil | | | | | | Total |
|---|---|---|---|---|---|---|---|---|
| | | 1 | 2 | 3 | 4 | 5 | 6 | |
| 2.3-dibromopropionitrile plus 1.2.2-trichloro-1-nitroethylene | 500+500 | 57 | 101 | 62 | 129 | 109 | 78 | 536 |
| Non-treated | | 310 | 236 | 307 | 353 | 229 | 329 | 1,764 |

What we claim is:

Soil disinfectant compositions comprising as active ingredients, mixtures of two compounds consisting of 1 part by weight of 2.3-dibromopropionitrile ($CH_2Br \cdot CHBrCN$) and from 0.5 to 2 parts by weight of 1.2.2-trichloro-1-nitroethylene ($CCl_2=CClNO_2$).

References Cited by the Examiner

UNITED STATES PATENTS 2,928,883　3/1960　Bachman et al. ____ 167—22
3,008,869　11/1961　Hopkins et al. ____ 167—22

FOREIGN PATENTS 603,471　8/1960　Canada.
37/17,245　10/1962　Japan.

LEWIS GOTTS, *Primary Examiner.*
JULES LEVITT, *Examiner.*
RICHARD L. HUFF, *Assistant Examiner.*